United States Patent [19]

St. Pierre

[11] Patent Number: 4,951,427

[45] Date of Patent: Aug. 28, 1990

[54] REFRACTORY METAL OXIDE COATED ABRASIVES AND GRINDING WHEELS MADE THEREFROM

[75] Inventor: Philippe D. St. Pierre, Worthington, Ohio

[73] Assignee: General Electric Company, Worthington, Ohio

[21] Appl. No.: 358,728

[22] Filed: May 30, 1989

[51] Int. Cl.$^5$ ............................................. B24D 3/00
[52] U.S. Cl. .................................... 51/293; 51/295; 51/298; 51/308; 51/309
[58] Field of Search ................. 51/293, 295, 298, 308, 51/309

[56] References Cited

U.S. PATENT DOCUMENTS

| | | | |
|---|---|---|---|
| Re. 31,883 | 5/1985 | Bovenkerk et al. | 51/295 |
| 3,528,788 | 9/1970 | Seal | 51/295 |
| 3,625,666 | 12/1971 | James | 51/295 |
| 3,650,714 | 3/1972 | Farkas | 51/309 |
| 3,664,819 | 5/1972 | Sioui et al. | 51/295 |
| 3,879,901 | 4/1975 | Caveney | 51/309 |
| 3,902,873 | 9/1975 | Hughes | 51/298 |
| 3,904,391 | 9/1975 | Lindstrom et al. | 51/295 |
| 3,924,031 | 12/1975 | Nicholas et al. | 51/295 |
| 3,929,432 | 12/1975 | Caveney | 51/309 |
| 3,984,214 | 10/1976 | Pratt et al. | 51/298 |
| 4,399,167 | 8/1983 | Pipkin | 51/309 |
| 4,689,242 | 8/1987 | Pike | 51/295 |
| 4,776,862 | 10/1988 | Wiand | 51/293 |

*Primary Examiner*—William R. Dixon, Jr.
*Assistant Examiner*—Willie J. Thompson
*Attorney, Agent, or Firm*—Gary L. Loser

[57] ABSTRACT

There are provided abrasive particles having a refractory metal oxide coating, a non-metallic precursor to a refractory metal oxide coating, or an elemental metal coating of at least about 20 weight percent of the abrasive particles. In addition abrasive tools such as grinding wheels, especially vitreous bonded grinding wheels, utilizing the coated abrasive particles are provided.

39 Claims, No Drawings

REFRACTORY METAL OXIDE COATED ABRASIVES AND GRINDING WHEELS MADE THEREFROM

BACKGROUND OF THE INVENTION

The present invention relates to abrasive particles, particularly cubic boron nitride (CBN) coated with a refractory metal oxide. The present invention also relates to grinding wheels made therefrom, especially vitreous bonding grinding wheels containing refractory metal oxide coated CBN particles as the abrasive material.

It is known in the art that the application of a metal coating to abrasive particles such as diamond and cubic boron nitrode improves the retention of such particles in the various matrices of abrasive tools. For example, U.S. Pat. No. Re. 31,883 discloses that CBN particles coated with from 30 to 80 weight percent of nickel are useful in the manufacture of improved resin bonded grinding wheels.

U.S. Pat. No. 4,011,064 describes CBN particles having a rough, flaky granular covering consisting essentially of a coating ranging in composition from metal to a mixture of boride and nitride of the metal intermediate the surface coating and the CBN particles. This reference teaches that metal oxide coated CBN should be fired in a reducing atmosphere to convert the coating to nitrides and borides.

U.S. Pat. No. 4,399,167 pertains to a method of metal coating diamond and cubic boron nitride by providing a mass of metal powder of from 125 to 37 microns in contact with the abrasive particles so as to form a mixture consisting essentially of metal powder and diamond or CBN particles, heat treating such mixture in a non-oxidizing atmosphere at a temperature below the melting point of the metal to allow the metal to deposit on the particles, and thereafter breaking up the loosely sintered mass to recover the metal coated abrasive particles.

U.S. Pat. No. 3,528,788 discloses resin bonded grinding wheels having embedded therein diamond grit material coated with from 25 to 275 parts of metal per 100 parts of diamond, said metal being selected from Ni, Co, Ag, Cu, Mo, Ti, Al, Mn, Cd, Zn, Cr, V, Au, W, Fe, Zn and the Pt-group metals.

It is also known in the art that the retention of diamonds of the metal bond or saw type in metal matrices can be improved by providing the particles with a double layer coating, the inner layer adjacent the particle being a carbide former such as titanium and the outer layer being a metal which alloys with the carbide former, for example, as disclosed in U.S. Pat. Nos. 3,826,630 and 3,929,432.

There still remains, however, the need for even more improved coated abrasive particles and grinding wheels made therefrom. Moreover, despite the numerous improvements in resin bonded grinding wheels and metal bonded grinding wheels, there have not been similar advances in respect of vitreous bonded grinding wheels, and particularly vitreous bonded grinding wheels containing cubic boron nitride as the abrasive material.

Such CBN containing vitreous bonded grinding wheels are very effective for high removal rates of steel in precision and form grinding. Unfortunately, the conventional glass frits used in preparing the bond matrix attack the CBN and cause bloating and slumping. It has now been discovered that by coating the CBN abrasive particles with a refractory metal oxide coating, the shortcomings of prior art vitreous bonded grinding wheels can be overcome.

SUMMARY OF THE INVENTION

It is an object of the invention to provide refractory metal oxide coated abrasive particles.

It is another object of the invention to provide coated CBN particles which exhibit improved resistance to attack by a vitreous matrix of a grinding wheel.

It is a further object of the invention to provide improved vitreous bonded grinding wheels.

In accordance with one aspect of the present invention there are provided abrasive particles having a refractory metal oxide coating thereon. Preferably, the refractory metal oxide coating comprises at least about twenty weight percent of the weight of the abrasive particles and, more preferably, the refractory metal oxide comprises from about twenty five to about fifty percent by weight of the abrasive particles.

The refractory metal oxide coating may be applied to the abrasive particles as such or it may be formed in situ, for example, by conversion of the elemental metal or other precursor coating such as a metal salt.

Titanium dioxide is the most preferred coating material, however, zirconia, alumina, silica or other material which dissolves slowly in alkali glasses can be used in the practice of the present invention.

While the following description of the invention will be with reference to cubic boron nitride particles and vitreous bonded grinding wheels, it is to be understood that the invention is also applicable to other abrasives, including, but not limited to, diamond, and silicon carbide as well as to other bonding matrices.

DESCRIPTION OF THE INVENTION

Alkali metal oxides are key constituents in most vitreous bond systems because they lower the working temperature of the glass and thereby expedite processing at lower temperatures than would normally be possible with silica, the primary glass-forming constituent. These commonly used fluxes attack CBN to form alkali borates with concomitant evolution of large quantities gas, primarily nitrogen and some ammonia if water is present. These phenomena lead to bloating and slumping of the desired grinding wheel form.

Accordingly, the present invention provides abrasive particles such as cubic boron nitride having deposited thereon an amount of refractory metal oxide effective for substantially eliminating attack on said CBN particle by the bond matrix of a vitreous bonded grinding wheel.

In addition to CBN, the present invention also applies to protecting diamond and conventional abrasive particles, such as silicon carbide as well as to fillers and the like. The size of the particles useful in the practice of the invention is not particularly limited and can be easily determined by those skilled in the art without undue experimentation.

The preferred refractory metal oxide coatings are titania ($TiO_2$), zirconia ($ZrO_2$), alumina ($Al_2O_3$) and silica ($SiO_2$), however, any other refractory metal oxide coating which is effective for substantially eliminating attack on the abrasive particles is included within the scope of the invention. As mentioned previously, the most important criteria in selecting the coating is that it dissolve slowly in alkali glasses.

The shield provided by the refractory metal oxide need not survive the total firing cycle of the vitreous bonding grinding wheel. Rather, it need only survive the high temperature manufacturing cycle during which time chemical attack is most likely to occur.

It is possible to provide the protective refractory metal oxide coating in a number of ways, for example, by applying the metal oxide directly to the particles or by conversion of elemental metal or other metal oxide precursor during manufacture of the grinding wheel.

If a metal oxide is to be deposited on the particles, any method known in the art may be employed, for example, evaporation of a precursor metal followed by oxidation. Preferably, such refractory metal oxide coating comprises at least about 20 percent by weight, on average, of the abrasive particles and, more preferably, comprises from about 25 weight percent to about 50 weight percent, on average, of the abrasive particles.

It may well be that a coating formed in situ is the most practical means for practicing the invention, for example, by conversion of a non-metallic precursor such as ethyl titanyl oxalate, ethyl silicate or the like. If such approach is adopted, the coating will be converted to the metal oxide during firing of the grinding wheel in an oxidizing atmosphere.

The non-metallic precursor coating can be applied by any convenient means such as mixing abrasive grains with an adhesive wetted surface in a fine powder of the required precursor. Of course, such non-metallic precursor coating should be such that it preferably comprises at least about 20 percent by weight, on average of the abrasive particles and, more preferably, from about 25 weight percent to about 50 weight percent, on average, of the abrasive particles when it is converted to the metal oxide.

At present, it is contemplated that the best mode for practicing the invention is to apply a metal, most preferably titanium metal, in its elemental form and subsequently convert it to the metal oxide during firing of the vitreous bonded grinding wheel. Titanium metal is especially preferred because it would rapidly oxidize during the firing cycle but remain in place. Moreover, the coefficient of expansion of the titanium oxide coating is closer to that of the CBN than that of the metal. Thus, the titanium not only forms a relatively adherent oxide coating whose volume is only about 7 percent greater than the metal, but one whose total growth by thermal expansion is also modest.

By contrast, the density differentials for nickel and chromium with their oxides are, respectively, 31 percent and 36 percent. Consequently, such coatings will be porous if oxidation takes place and they will not fit the CBN grain substrate. If oxidation does not take place and the metallic form is retained, the coating will peel off on heating because of the large difference in the coefficient of thermal expansion between CBN and the metal.

The elemental metal coating can be applied by any conventional technique, for example, cathode sputtering as described in U.S. Pat. No. 3,351,543 or via a salt bath as described in U.S. Pat. No. 2,746,888, both of which are incorporated by reference into the present disclosure. Again, the metal coating should be such that is preferably comprises at least about 20 percent by weight, on average, of the abrasive particles and, more preferably, from about 25 weight percent to about 50 weight percent, on average, of the abrasive particles when converted to the metal oxide.

Although the refractory metal coated particles are especially contemplated for use in vitreous bonded grinding wheels, the benefits associated with the use of such refractory metal oxide coated particles is expected in other bonding matrices such as are employed in metal bonded and resin bonded grinding wheels. Because the manufacture of vitreous bonded, metal bonded and resin bonded grinding wheels is well known in the art and extensively described in the literature, no further disclosure in necessary herein.

EXAMPLES

The following examples are presented to illustrate the invention and the practice thereof and are not intended as a limitation. All parts are on a weight basis unless otherwise indicated.

EXAMPLE 1

10 grams of 230/270 mesh cubic boron nitride are mixed with 50 grams of a salt mixture comprising 55% KCl, 40% NaCl, and 5% CaCl2. 5 grams of −400 mesh titanium metal powder are added to the mix and it is all melted in a porcelain crucible under argon at 830° C. for 3 hours. After cooling and solidification, the salt and excess titanium are washed away by leaching and decantation with water. Any remaining titanium powder is removed from the surface of the cBN by washing on a sieve whose aperture is less than the diameter of the cBN grains.

This treatment will yield a coating of 25-30% by weight of titanium metal on 230/270 mesh cBN. It must be understood that the objective is to deposit a precursor coating of titanium metal that is about 2 microns thick. This means that different weights of metal will be needed to achieve such a coating depending on the particle size of the cBN and the roughness of the surface.

In addition, it must be appreciated that the amount and rate of deposition of the titanium will also depend on the bath temperature, composition, and particle size of the titanium powder used. Thus the above example is merely illustrative of the conditions needed to obtain the desired thickness. For any given set of materials and processing equipment, trials must be run to obtain the thickness of coating that will survive the sintering conditions dictated by the abrasive wheel manufacturing process.

EXAMPLE 2

This is a repeat of example 1 except that the titanium is replaced by zirconium powder of similar size. Since the density of zirconium is approximately ×1.4 than of titanium, the weight of metal deposited must be increased in similar proportion to achieve the same thickness on a particle of given size and surface roughness.

EXAMPLE 3

Cubic boron nitride grains are set on a vibratory tray in a commercial metal evaporator such as that used to evaporate aluminum decoration onto plastic parts. The aluminum is evaporated according to the specific procedures recommended for the unit being used. The vibrated particles tumble and so expose all surfaces to the condensing aluminum vapor.

Since the aluminum oxide derived from the metal precursor is about ×0.8 the density of titanium oxide that protects in example 1 above about 20% less weight for a given thickness is required. Thus the evaporator is run until sufficient metal precursor is built up to yield the correct thickness of oxide.

When the aluminum coated cBN is mixed with the frit and formed into a wheel it shouuld be heated below the melting point of aluminum (658° C.) for 10 to 20 minutes to oxidize the metal. In the cases of titanium and zirconium noted above the oxidation is virtually instantaneous on heating.

EXAMPLE 4

Cubic boron nitride is slurred with tetraisopropyl titanate, and the metal organic decomposed by first drying at 100° C. and then heating in air to form a metal oxide coating on the cBN. The decomposition of oxide may conveniently be accomplished by dropping the dried grains down a hot tower so that the grain in so passing transiently reaches about 600° C. The cBN thus coated with an amorphouse layer of $TiO_2$ may then be mixed with frit and formed into a wheel. It is then sintered according to the prescribed manufacturing process for the operation in question.

I claim:

1. An abrasive particle having at least 20% by wgt. refractory metal oxide selected from the group consisting of titania, zirconia, alumina and silica substantially covering the surface of said abrasive particles.

2. An abrasive particle as set forth in claim 1, wherein said abrasive particle is selected from the group consisting of cubic boron nitride, diamond, silicon carbide and mixtures thereof.

3. An abrasive particle as set forth in claim 1, wherein said abrasive particle is selected from the group consisting of cubic boron nitride, diamond, and mixtures thereof.

4. An abrasive particle as set forth in claim 1, wherein said abrasive particle is cubic boron nitride.

5. An abrasive particle as set forth in claim 4, wherein said refractory metal oxide coating is present in an amount effective for substantially elminating attack on said cubic boron nitride particle by a vitreous bond matrix of a grinding wheel.

6. An abrasive particle as set forth in claim 1 or claim 5, wherein said refractory metal oxide is titania.

7. An abrasive particle as set forth in claim 1, wherein said refractory metal oxide is titania.

8. An abrasive particle having up to about 20% non-metallic precursor to at least 20% by wgt. refractory metal oxide substantially covering the surface of said abrasive particle.

9. An abrasive particle as set forth in claim 8, wherein said abrasive particle is selected from the group consisting of cubic boron nitride, diamond, silicon carbide, and mixtures thereof.

10. An abrasive particle as set forth in claim 8, wherein said abrasive particle is selected from the group consisting of cubic boron nitride, diamond and mixtures thereof.

11. An abrasive particle as set forth in claim 8, wherein said abrasive particle is cubic boron nitride.

12. An abrasive particle as set forth in claim 11, wherein said non-metallic precursor is present in an amount effective for substantially eliminating attack on the cubic boron nitride particle by a vitreous bond matrix of a grinding wheel, upon conversion of said non-metallic precursor to a metal oxide.

13. An abrasive particle as set forth in claim 8 or claim 12, wherein said non-metallic precursor is an organometallic compound.

14. An abrasive particle as set forth in claim 13, wherein the metal constituent of said organometallic compound is titanium.

15. An abrasive particle as set forth in claim 8, wherein said non-metallic precursor is present in an amount sufficient to comprise from about 25 weight percent to about 50 weight percent, on average, of the abrasive particle when it is converted to the metal oxide.

16. An abrasive particle as set forth in claim 1, wherein said non-metallic precursor is ethyl titanyl oxalate.

17. A tool comprising abrasive particles embedded in a bonding matrix, said abrasive particles having at least 20% by wgt. refractory metal oxide selected from the group consisting of titania, zirconia, alumina and silica substantially covering the surface of said abrasive particles.

18. A tool as set forth in claim 17, wherein said tool is a grinding wheel.

19. A tool as set forth in claim 18, wherein said bonding matrix is a vitreous bond matrix.

20. A tool as set forth in claim 19, wherein said abrasive particles are cubic boron nitride.

21. A tool as set forth in claim 20, wherein said refractory metal oxide coating is present in an amount effective for substantially eliminating attack on said cubic boron nitride particles by said vitreous bond matrix.

22. A tool as set forth in claim 21, wherein said refractory metal oxide comprises at least about 20 percent by weight, on average, of said cubic boron nitride particles.

23. A tool as set forth in claim 21, wherein said refractory metal oxide comprises from about 25 weight percent to about 50 weight percent, on average, of said cubic boron nitride particles.

24. A tool as set forth in claim 21, wherein said refractory metal oxide is titania.

25. A tool comprising abrasive particles embedded in a bonding matrix, said abrasive particles having up to about 20% non-metallic precursor to at least 20% by wgt. refractory metal oxide selected from the group consisting of titania, zirconia, alumina and silica substantially covering the surface of said abrasive particles.

26. A tool as set forth in claim 25, wherein said tool is a grinding wheel.

27. A tool as set forth in claim 26, wherein said bonding matrix is a vitreous bond matrix.

28. A tool as set forth in claim 27, wherein said abrasive particles are cubic boron nitride.

29. A tool as set forth in claim 28, wherein said non-metallic precursor is present in an amount effective for substantially eliminating attack on said cubic boron nitride particles by said vitreous bond matrix upon conversion of said non-metallic precursor to a metal oxide.

30. A tool as set forth in claim 29, wherein said non-metallic precursor is present in an amount sufficient to comprise at least about 20 percent by weight, on average, of the cubic boron nitride particles upon conversion of said non-metallic precursor to a metal oxide.

31. A tool as set forth in claim 29, wherein said non-metallic precursor is present in an amount sufficient to comprise from about 25 weight percent to about 50 weight percent, on average, of said cubic boron nitride particles when it is converted to the metal oxide.

32. A tool as set forth in claim 29, wherein said non-metallic precursor is an organometallic compound.

33. A tool comprising abrasive particles embedded in a bonding matrix, said abrasive particles having an elemental metal coating which substantially covers the surface thereof and which is present in an amount sufficient to comprise at least about 20 percent by weight, on average, of the abrasive particles when it is converted to the metal oxide.

34. A tool as set forth in claim 33, wherein said tool is a grinding wheel.

35. A tool as set forth in claim 34, wherein said bonding matrix is a vitreous bond matrix.

36. A tool as set forth in claim 35, wherein said abrasive particles are cubic boron nitride.

37. A tool as set forth in claim 36, wherein said elemental metal is present in an amount sufficient to comprise from about 25 weight percent to about 50 weight percent, on average, of said cubic boron nitride particles when it is converted to the metal oxide.

38. A tool as set forth in claim 37, wherein said elemental metal is titanium metal.

39. A method for making a refractory metal oxide coated tool comprising:
   (a) blending: (i) abrasive particles having a non-metallic precursor to a refractory metal oxide substantially covering the surface of said abrasive particles; (ii) abrasive particles having an elemental metal coating which substantially covers the surface of said abrasive particles, the elemental metal being present in an amount sufficient to comprise at least about 20 percent by weight, on average, of the abrasive particles when it is converted to the metal oxide; or (iii) a mixture thereof in a vitreous bond frit matrix;
   (b) placing said blend in a suitable mold and pressing said molded blend;
   (c) firing said molded blend in an oxidizing atmosphere at a temperature and for a time effective for converting the coated abrasive particles of (a) to refractory metal oxide coated abrasive particles.

* * * * *